(12) United States Patent
Van Dalen

(10) Patent No.: US 8,049,724 B2
(45) Date of Patent: Nov. 1, 2011

(54) AEE (ARTICULATED, ELEVATED, ERGONOMIC) COMPUTER MOUSE

(76) Inventor: Phillip Francois Van Dalen, Rohnert Park, CA (US)

(*) Notice: Subject to any disclaimer, the term of this patent is extended or adjusted under 35 U.S.C. 154(b) by 733 days.

(21) Appl. No.: 12/011,694

(22) Filed: Jan. 29, 2008

(65) Prior Publication Data

US 2008/0186279 A1 Aug. 7, 2008

Related U.S. Application Data

(60) Provisional application No. 60/898,675, filed on Feb. 1, 2007.

(51) Int. Cl.
*G06F 3/033* (2006.01)
(52) U.S. Cl. .......................................... 345/163
(58) Field of Classification Search .............. 345/163
See application file for complete search history.

(56) References Cited

U.S. PATENT DOCUMENTS

| | | | | |
|---|---|---|---|---|
| 5,473,325 A * | 12/1995 | McAlindon | ........................ | 341/20 |
| 5,528,265 A * | 6/1996 | Harrison | ........................ | 345/158 |
| 5,889,507 A | 3/1999 | Engle et al. | | |
| 5,894,303 A * | 4/1999 | Barr | ........................ | 345/163 |
| 6,072,471 A * | 6/2000 | Lo | ........................ | 345/163 |
| 6,462,730 B2 * | 10/2002 | Numata et al. | ........................ | 345/156 |
| 6,727,889 B2 * | 4/2004 | Shaw | ........................ | 345/163 |
| 7,768,500 B2 * | 8/2010 | Saez et al. | ........................ | 345/163 |
| 2002/0075233 A1 * | 6/2002 | White et al. | ........................ | 345/161 |
| 2006/0176273 A1 * | 8/2006 | Wolfe | ........................ | 345/156 |

OTHER PUBLICATIONS

U.S. Appl. No. 11/444,876, filed Dec. 6, 2007, Daniel L. Odell, Monique Chatterje, pp. 1-17.

* cited by examiner

*Primary Examiner* — Amr Awad
*Assistant Examiner* — Jonathan Boyd

(57) ABSTRACT

An ergonomic computer mouse whose design and function is solely dedicated to ergonomic benefit and optimal operator comfort for improved operator efficiency and avoided injury. The ergonomically formed mouse body is elevated from a fixed base structure via a short rigid pedestal where the ball-and-socket interface to the mouse body allows for a wide range of adjustment across three axis of positioning. This adjustment is lockable into an operator-selected position which best meets individual operator's ergonomic and comfort requirements. Once in locked mode, the operator's arm, wrist and hand remain stationary to operate the standardized prior art mouse controls, thereby achieving a zero-motion ergonomic benefit. The current art ergonomic mouse solution provides any computer mouse operator with the ability to achieve optimal ergonomic form, comfort and operation under virtually any workstation condition.

2 Claims, 7 Drawing Sheets

AEE (ARTICULATED, ELEVATED, ERGONOMIC) COMPUTER MOUSE

RELATED APPLICATIONS

The present invention claims priority on provisional patent application 60/898,675, filed on Feb. 1, 2007, entitled "AEE (articulated, elevated, ergonomic) computer mouse" and is hereby claimed and incorporated by reference.

FEDERALLY SPONSORED RESEARCH OR DEVELOPMENT

Not Applicable

REFERENCE TO ADDITIONAL MATERIALS SUBMITTED

Not Applicable

FIELD OF THE INVENTION

This invention relates to the personal computer input device, operated by a computer operator's hand, known as a computer mouse. It specifically relates to prior art ergonomic mouse designs that attempt in various degrees of success to reduce repetitive motion related mouse operator discomforts and injury.

BACKGROUND OF THE INVENTION

The standard input device for controlling cursor movement and other operator functions on personal computers and related computer applications is the computer mouse. Prior art computer mouse design has evolved into several various forms and methods of operation. The typical means is by a generally palm-sized device that mimics the general shape of the underside of the hand, allowing for the computer operator's arm and wrist to impart two dimensional movement of the mouse on a flat surface that translates into the two dimensional movement of the cursor on the computer screen. Finger operated switches for cursor activation and special computer functions are typically operated by the first two fingers from the thumb. A "scroll wheel" device is usually positioned roughly between these two switch controls for paging control of documents amongst other things. More recent embodiments of the prior art samples eliminate the mechanical motion sensing mechanism that requires traction-based contact with a mouse pad surface, replacing this with a light-based optical sensing mechanism. Other embodiments have incorporated a wireless connection to transmit control signals between the wireless mouse and the target computer, eliminating the physical wire connection that may inhibit proper mouse operation.

Use of the prior art computer mouse requires that the operator continuously move the mouse across the two-dimensional mouse pad surface located immediately to the right of the keypad for right-handed operators (to the left side for left-handed operators) in motions directly related to the desired two-dimensional movement of the cursor on the computer screen. The controlling hand of the mouse operator generally rests across the top of the mouse, but often the operator's hand may contact or even rest on the mouse pad at the wrist location with the weight of the hand, wrist and forearm upon the point of contact. Continued operation of the mouse requires repetitive movements in any and all directions along the horizontal plane represented by the computer mouse pad or contact surface. The position of the operator's hand while operating the mouse device may impart varying degrees of pressure and various degrees of deflection on the wrist area.

A growing issue with the use of the computer mouse is the incidence of Repetitive Strain Injury (RSI), also referred to as Cumulative Trauma Disorder (CTD), Occupational Overuse Syndrome, or Work Related Upper Limb Disorder (WRULD), One particular manisfistation is Carpal Tunnel Syndrom. All are products of repetitive motion situations where improper ergonomic technique and inadequate design and/or workstation configuration can lead to discomfort in the short run and strain and injury in the long run. This can result in a reduction of worker productivity, and ultimately in chronic pain, quality of life issues, high costs for medical care and medical leave of absense. There are now general standards of practice for workplace ergonomic convention aimed at minimizing the possible onset of RSI as well as various other discomforts and stresses to the body from extended periods of workstation activity. These programs incorporate both training and use of ergonomically designed workstation equipment. Primary to improved ergonomic standard are the various embodiments of prior art ergonomic mouse configurations, each representing varying degrees of benefit. Prior art ergonomic solutions may offer taller mouse body shapes to help reduce the potential for stress upon the wrist. Others may incorporate a more vertically oriented griping structure to rotate the hand into a more comfortable vertical position of reduced wrist pronation. However, the preceding examples still require the mouse operator to engage in repetitive movement of the mouse across a flat surface to manipulate the cursor. Another prior art ergonomic mouse embodiment replaces repetitive movement of the mouse for cursor control with a "track ball" feature in which movement of a spherical device by the thumb controls cursor placement while the mouse body remains stationary. However, the trackball solution still requires substantial and exaggerated repetitive movement of the thumb to operate, leading to the likelihood of operator discomfort and possible development of RSI. An option for cursor control where a mouse may not be usable or space does not permit, such as with a laptop computer, is the miniature joystick or control "nub," which is comparable in size to a pencil head eraser. This device as previously incorporated within a laptop computer keyboard requires only the slightest movement by an operator's finger for cursor operation. One embodiment of this device is represented by application Ser. No. 08/685,486 filed on Jul. 24, 1996.

The fault with prior-art ergonomic mouse design is primarily two-fold: 1) it presumes the mouse operator will engage in proper ergonomic form for sitting at a workstation when holding and operating the mouse in order to obtain the greatest degree of ergonomic benefit, and 2) it does not provide for a solution in which all operators can achieve optimal hand, wrist and forearm positioning while operating the mouse for maximum ergonomic benefit under all possible workstation conditions. Application Ser. No. 11/349,751, filed Feb. 8, 2006, specifies a similar approach incorporating the pedestal and articulation features of the current art but for an entirely different goal focused on advanced cursor control function with ergonomic considerations subordinate to this feature. In fact, the referenced device requires that the mouse operator engage in significant rocking motions of the mouse body controller to enable cursor movement, resulting in potentially complex and continuous wrist motion and deflections. With the multitude of prior art ergonomic mouse designs on the market, computer mouse operator discomfort and RSI cases continue to be a serious problem still in need of a viable solution.

SUMMARY OF THE INVENTION

An enhanced computer mouse of ergonomic design and operation using prior art cursor and mouse control functions that is mounted on a short pedestal with a ball-and-socket mechanism allowing for full positional adjustment articulation, thereby providing for superior adjustable mouse positioning to best suit individual operator ergonomic needs and comfort requirements. The three key features of the AEE Computer Mouse are; 1) articulation, 2) elevation and 3) ergonomic design. The mouse body is shaped and contoured to fit a partially closed hand position (indicative of the hand in a relaxed state) for broad, conforming surface area contact with the palm of the hand. The approximate two-to-three inch elevation eliminates any contact of the hand and wrist to surrounding surfaces and allows for the weight of the hand and forearm to be supported at the palm by the current art ergonomic mouse body. The swivel feature of the pedestal-to-mouse interface allows the mouse body to be moved into a wide range of adjustments based upon any combination of the three axis of movement: 1) tilt left and right for wrist pronation adjustment, 2) tilt forward and backward for wrist flexion and extension adjustment, and 3) rotation left and right for adjustment of the ulnar deviation of the wrist. Once a suitable position is selected that best meets the operator's proper ergonomic form and comfort needs, the ball-and-socket is locked into a fixed position: the operator's hand, wrist and arm now remains stationary in one optimal position during the course of operating the mouse. Hand movement is limited to the slight first two finger movements to operate the left and right mouse function buttons and the scroll wheel, and a minimal movement of the thumb is required to operate cursor movement via the miniature cursor control joystick as found on some laptop computers. The cursor control joystick "nub" greatly reduces repetitive thumb movements associated with track ball designs due to the almost imperceptible degree of deflection required. The ergonomic mouse pedestal is rigidly attached to a weighed fixed base structure that takes the place of the standard mouse pad. An optional mount design allows for connection of the AEE Computer Mouse to keyboards, laptops, or various workstation structures including, but not limited to, keyboard trays and computer carts.

The reality is that the body must still be physically engaged to some degree to perform the work activities associated with personal computer use. The challenge is how best to manage those movements to reduce or eliminate discomfort and the onset of injury. The objective realized with this invention is achieving what prior art ergonomic mouse designs have not which is to provide any and all computer mouse operators at any and all workstation environments with optimal comfort, optimal wrist positioning and avoided injury. Based on the superior adjustability qualities and "zero-motion" operation of the current art, those already suffering from RSI or related issues, even those required to wear a wrist brace as a result, would find the current art design far superior over prior art to still allow non-pain inducing mouse operation, and even potentially providing symptom recovery over time as the current art design would not interfere with the immobility and orientation requirements of the recovering RSI sufferer. While slight thumb and finger motions are still required to operate the operator controls of this invention, the potential impact of those repetitive yet minor motions are still within reason of the types of motions not generally connected to the established problem areas of discomfort and injury.

DETAILED DESCRIPTION OF PREFERRED EMBODIMENTS

Figure 1:
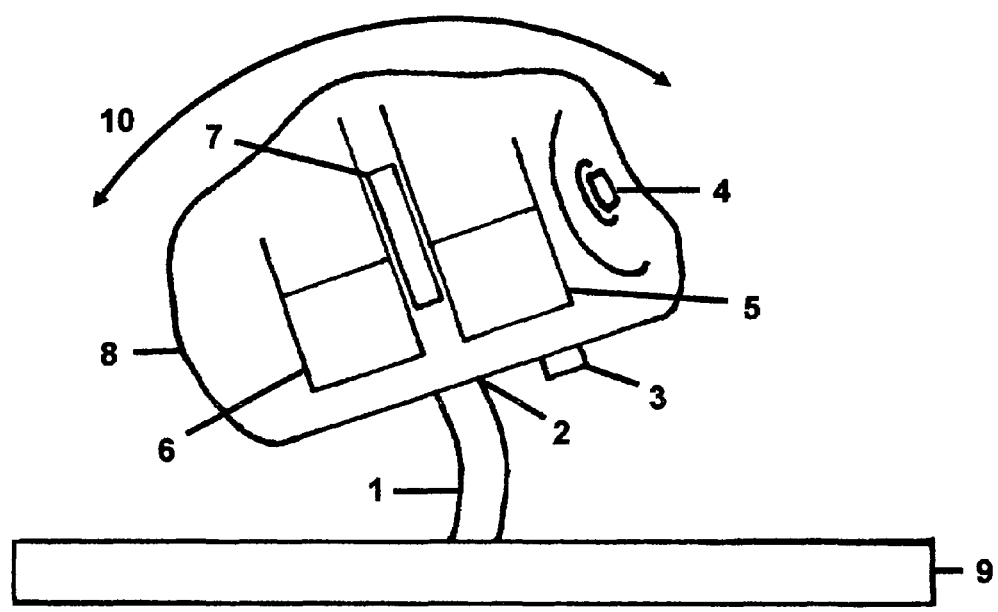
FIG. 1 The front view of the device identified in claim 1, depicting the ergonomic mouse body, rigid pedestal mount and the supporting fixed base structure in accordance with one embodiment.

As referenced in FIG. 1, the current art ergonomic mouse consists of an ergonomically shaped body 8 which specifically conforms to the general shape of the underside of the human hand in a partially closed position. This is intended not only to provide the operator with a more natural hand posture but to also allow the operator's hand and forearm weight to be comfortably supported at the palm. To isolate the operator's hand from undesirable contact with any surface other than that of the current art mouse, said ergonomic mouse body is elevated from a supporting platform 9 by a short rigidly affixed pedestal 1 which may be from two to three inches in height. It is this elevation that enables the first of three key ergonomic benefits: full support of the operator's hand and forearm by the ergonomic mouse body.

The depression on the left side of said ergonomic mouse body is intended to receive the human thumb of a right-handed operator. In this frontal view of FIG. 1, the basic features of prior art mouse design is apparent: "right click" 6 and "left click" 5 buttons represent continuation of prior art functions while a scroll wheel 7 provides for typical prior art screen scrolling and image sizing functions. The movement of the cursor found on the computer screen is manipulated by a miniature thumb controlled joystick or "nub" 4 as seen on the left hand side of the ergonomic mouse body. Slight movements applied by the operator's thumb on said cursor control "nub" cause the cursor on the computer screen to move accordingly. Slightly increased applied pressure results in faster cursor movement across the computer screen. The input signals of these controls may be transmitted by either wired or wireless means. In an effort to minimize finger movements required to operate the scroll wheel, the scroll wheel feature and function may be expressed instead by a derivative of the cursor control "nub" function so that only the slightest finger movement is required to enable screen scrolling and image sizing functions from generally the same location as the scroll wheel of prior art design.

The interface between the ergonomic mouse body 8 and the pedestal 1 is the ball-and-socket joint, the junction indicated by 2. This is further detailed in FIG. 4 to show approximate location and form of said joint. The purpose of the ball-and-socket joint is to allow the ergonomic mouse body to be rotated in any combination of movements along an "x" axis 10 of FIG. 1 and FIG. 2 for left and right tilt to achieve desired degree of wrist pronation, movement along a "y" axis 12 of FIG. 3 and FIG. 4 for forward and backward tilt to achieve desired wrist flexion and extension position, and along the "z" axis of movement 13 of FIG. 5 for rotation left and rotation right to achieve desired ulnar positioning of the wrist. This feature enables the second and third of the three key ergonomic benefits: a wide range of adjustability of the position of the current art ergonomic mouse body relative to the operator's individual ergonomic requirements and usage situation, and "zero-motion" operation where the operator's arm and wrist do not need to move in order to operate the current art ergonomic mouse. The ball-and-socket mechanism allowing the movements described may be expressed by other embodiments obvious to those skilled in the art.

Figure 2:
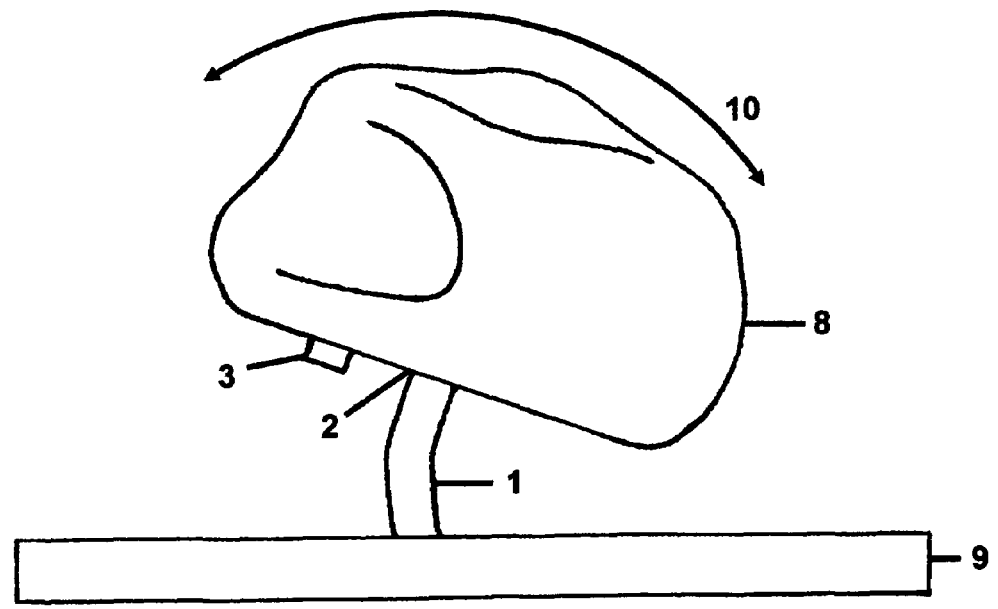
FIG. 2 The rear view of the device identified in claim 1, depicting the ergonomic mouse body, rigid pedestal mount and the supporting fixed base structure in accordance with one embodiment.
Figure 3:
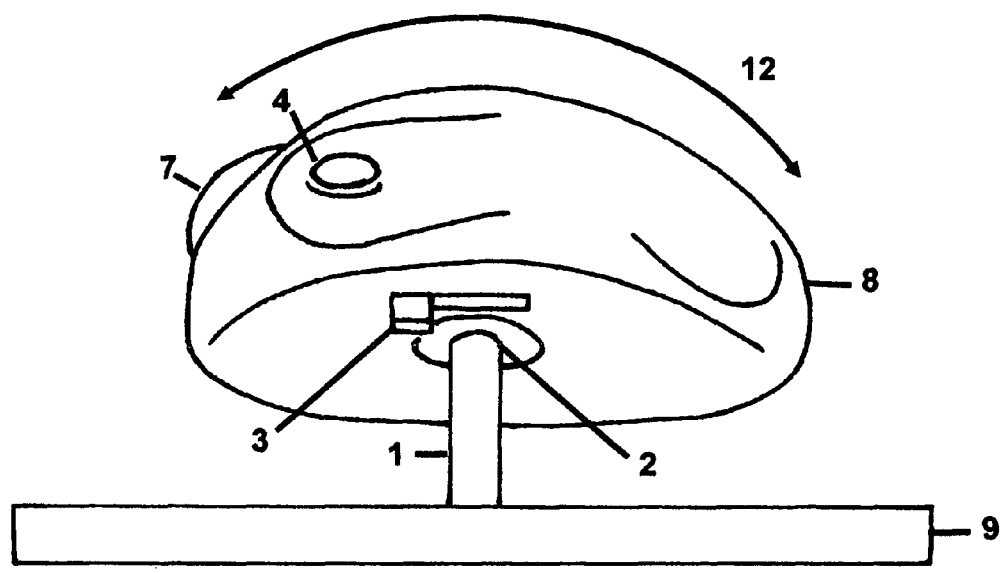
FIG. 3 The left side view of the device identified in claim 1, depicting the ergonomic mouse body, the rigid pedestal mount and the supporting fixed base structure in accordance with one embodiment.
Figure 4:
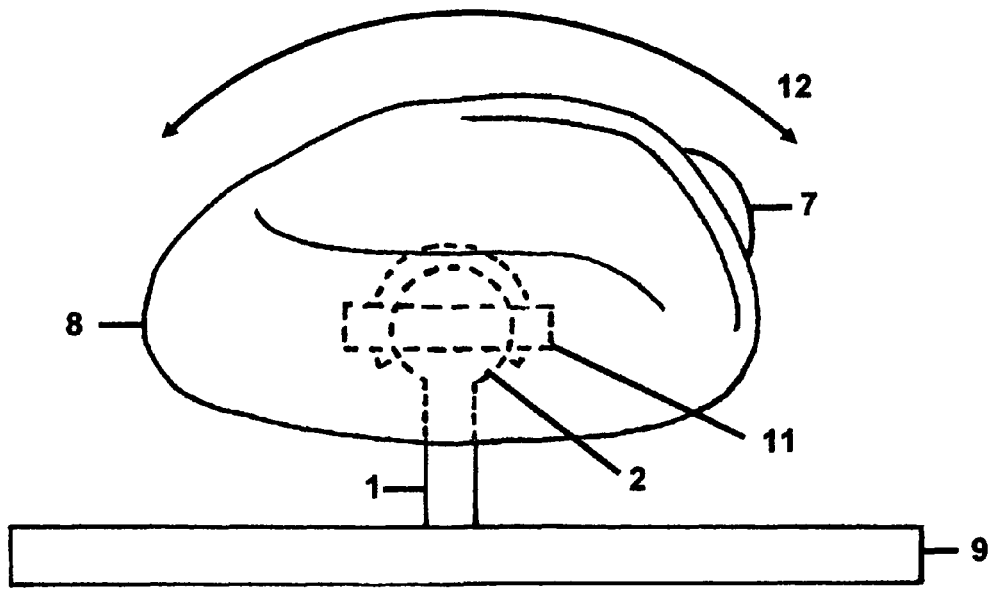
FIG. 4 The right side view of the device identified in claim 1, depicting the ergonomic mouse body, rigid pedestal mount and the supporting fixed base structure in accordance with one embodiment.
Figure 5:
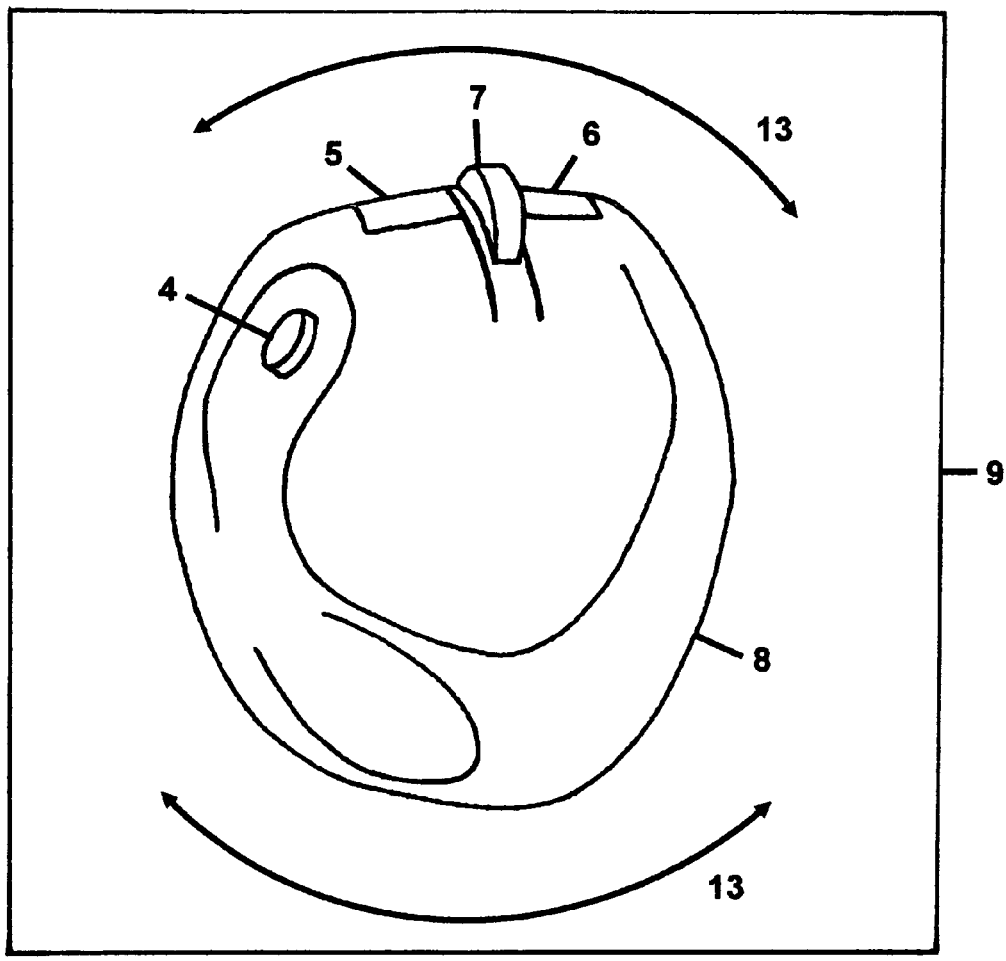
FIG. 5 The top view of the device identified in claim 1, depicting the ergonomic mouse body and the supporting fixed base structure in accordance with one embodiment.

The current art ergonomic mouse operator enables the three axis of movement by releasing a position lock 3 seen in FIG. 1, FIG. 2 and FIG. 3. Lock mechanism 11 is generally depicted in FIG. 4 and may take on alternate embodiments as deemed appropriate by those skilled in the art. Once the position lock is released, the operator need only apply light pressure to overcome the intentional slight drag imparted within the ball-and-socket mechanism and reposition the ergonomic mouse body in the desired orientation. Once the desired orientation is achieved, the operator sets the position lock to secure the selected orientation. The ergonomic mouse body orientation will not change unless these steps are repeated. As each individual user may have unique physical dimensions and qualities when compared to the average operator, each specific workstation arrangement, in combination with the unique operator physical qualities may also be different from the standard workstation ideal so that prior art ergonomic mice offer inadequate resolution to wrist strain. The current art ergonomic embodiment allows the operator to optimize the position of the hand operating the ergonomic mouse to result in an optimal wrist positioning of comfort as each individual operator requires and/or desires. As a critical function of providing the body with alternate positions to release the accumulated stress of any ideal position held over an extended amount of time, the operator may alter the ergonomic mouse orientation to achieve the desired adjustment. Should the operator's chair, keyboard tray or related workstation structure not be properly adjustable for the best posture, reach, arm and hand positioning standards, the current art ergonomic mouse can easily be adjusted to permit optimal hand and wrist positioning under virtually any workstation condition or configuration. In addition, the elevation of the current art ergonomic mouse allows for forearm and hand weight to be borne by the palm, eliminating pressure and load strains upon the wrist.

Figure 6:
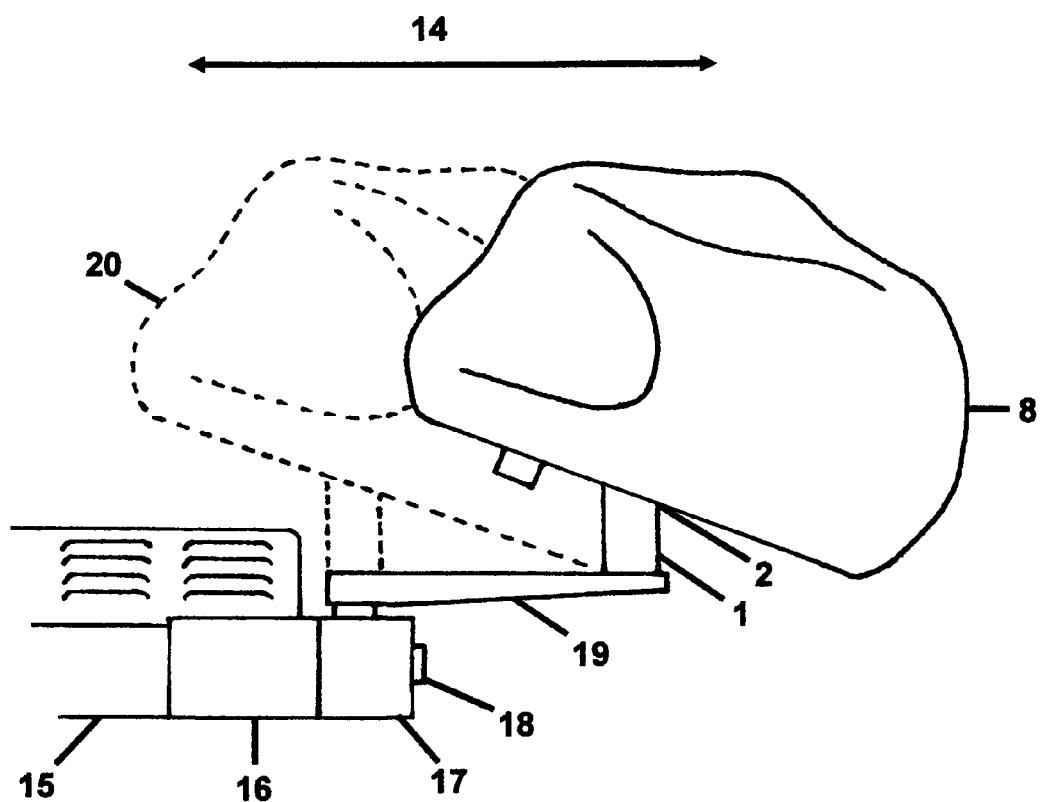
FIG. 6 The rear view of the mouse body identified in claim 1 and the device identified in claim 2, depicting the articulated arm and pedestal mount design in accordance with one embodiment.
Figure 7:
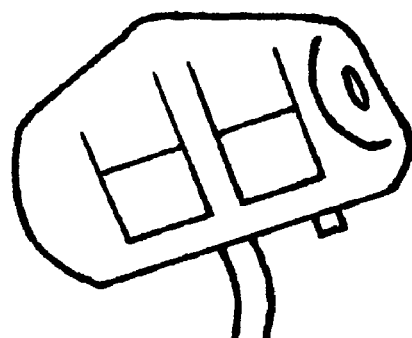
FIG. 7 The neutral position of the x-axis of movement of the device identified in claim 1.
Figure 8:
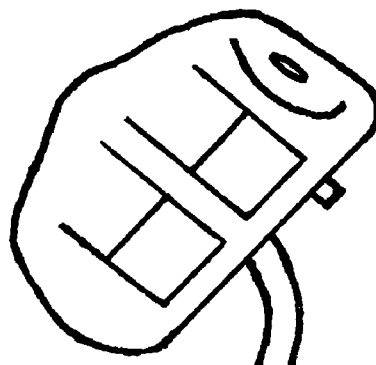
FIG. 8 The right-tilt position of the x-axis of movement of the device identified in claim 1.
Figure 9:
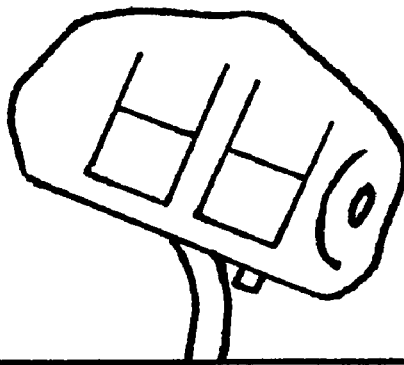
FIG. 9 The left-tilt position of the x-axis of movement of the device identified in claim 1.
Figure 10:
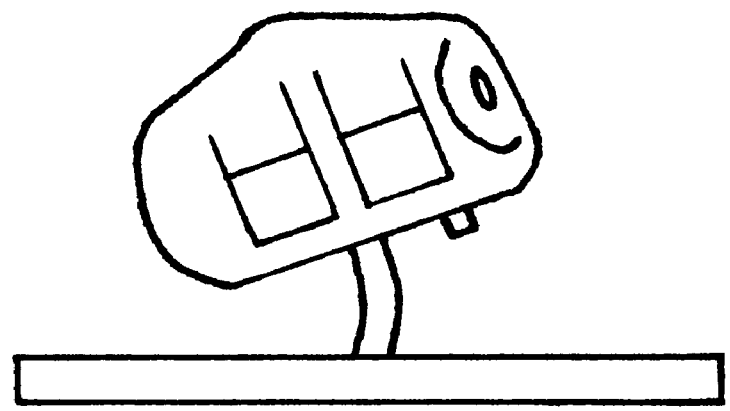
FIG. 10 The neutral position of the y-axis of movement of the device identified in claim 1.
Figure 11:
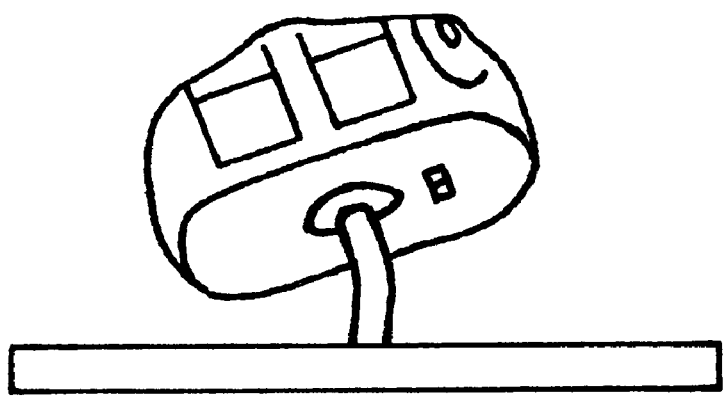
FIG. 11 The backward tilt position of the y-axis of movement of the device identified in claim 1.
Figure 12:
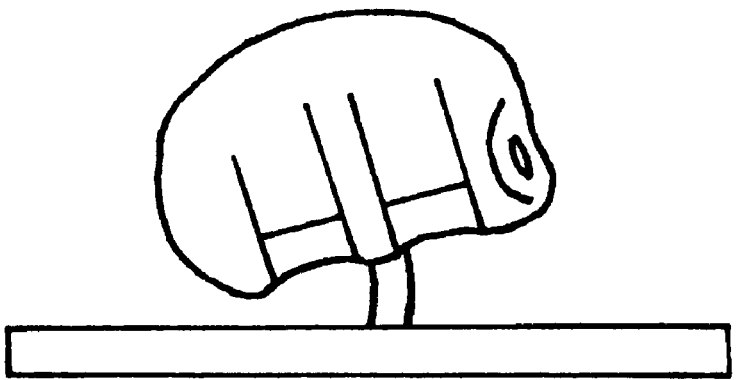
FIG. 12 The forward tilt position of the y-axis of movement of the device identified in claim 1.
Figure 13:
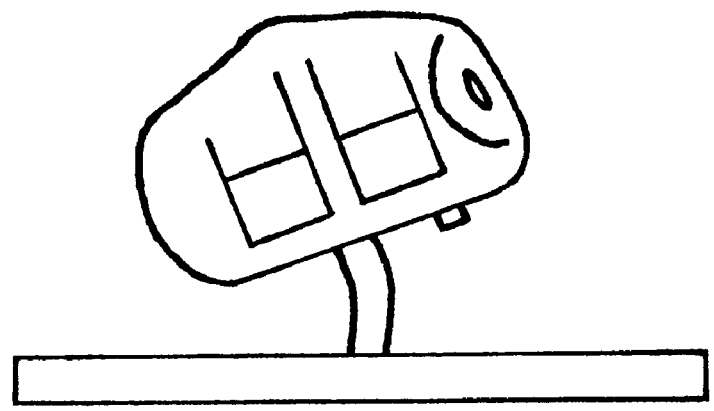
FIG. 13 The neutral position of the z-axis of movement of the device identified in claim 1.
Figure 14:
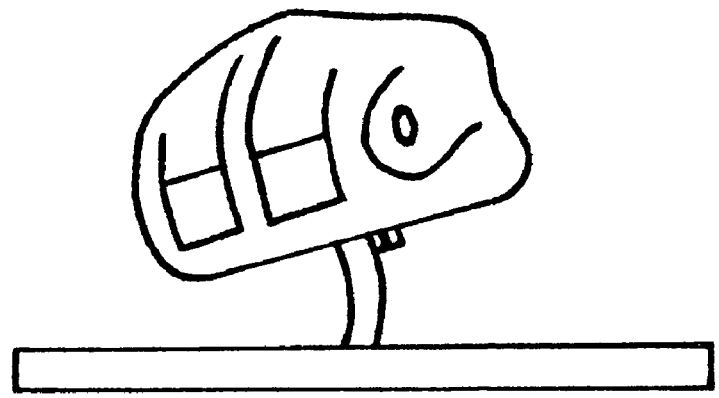
FIG. 14 The right-twist position of the z-axis of movement of the device identified in claim 1.
Figure 15:
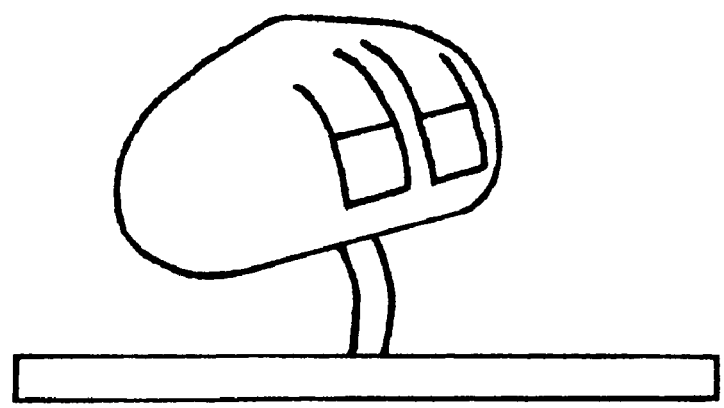
FIG. 15 The left-twist position of the z-axis of movement of the device identified in claim 1.

As referenced in FIG. 6 and supported in claim 2, a rear view of the present art mouse body 8 applied to an alternate embodiment of a pedestal and articulated mount solution. This alternate mounting solution established in claim 2 allows for the operator to have the present art ergonomic mouse to be mounted to the operator's keyboard, laptop computer, keyboard tray or other workstation features and arrangements, providing for not only the same three axis adjustability described within claim 1, but also variable relational positioning to the operator's keyboard or work area. This embodiment of the present art mouse still utilizes the ball-and-socket interface 2 feature and the pedestal 1, although the pedestal may be of altered form to better meet the needs of the claim 2 functionality as deemed necessary by those skilled in the art. The pedestal 1 is connected to a moveable position arm 19 that may possess a downward shaft at the opposite end from the pedestal attachment. The shaft portion of the position arm is contained within a receiving base and lock unit 17 with the ability to be rotated, along the center axis of the shaft, from a position facing away from the operator and parallel to the keyboard to a position facing toward the operator and parallel to the keyboard, representing 180 degrees of motion. The receiving base and lock unit 17 is integral to a rail-like component 16 attached to the side of a keyboard 15 or related device or structure and can be slid forward and backwards along the side dimension of the operator's keyboard. This attachable bracket assembly may be expressed by various embodiments obvious to those skilled in the art. Movement of the receiving base and lock unit and the position arm are both enabled by the operator pressing the lock release button 18. The combination of the receiving base and lock unit movement along the side of the keyboard and the pivot movement of the position arm results in the ability to move the present art mouse body in a number of positions of an unspecified range in both left and right, forward and back orientation relative to the keyboard or targeted work location. The possible left-and-right motion is indicated by 14 of FIG. 6. An alternate adaptation of the present art keyboard mounting embodiment may be to enable said mounting embodiment to the back of a keyboard or related workplace structure for greater range of positional options relative to the width of the operator's work area. One skilled in the art can see how this mounting device may be expressed in various embodiments that apply the said operator function but with various enabling solutions.

What is claimed is:

1. An ergonomic computer mouse that allows for a wide range of operator-adjustable positions-of-use comprising: a) an ergonomic mouse body that closely conforms to the shape of the underside of the average human hand in a partially closed and relaxed, grasping position; b) wherein said ergonomic mouse body includes a miniature cursor control joystick operable by the operator's thumb; c) a fixed base structure; d) a short and generally vertically oriented pedestal rigidly affixed to said fixed base structure and incorporating a generalized curvature as needed so that the interface of the pedestal centerline to said ergonomic mouse body is generally perpendicular when the mouse body is in the optimal ergonomic starting point of adjustment which is generally a 30 to 40 degrees tilt from parallelism to the fixed base structure when said fixed base structure is parallel to the workstation floor; e) wherein said pedestal includes a ball-and-socket mechanism integral to the top of said pedestal; f) the ball and socket mechanism of said pedestal being connected internally to said ergonomic computer mouse body to allow for a variable three axis of movement of said ergonomic computer mouse body; g) said ball and socket incorporating a mechanism to impart resistance during positional adjustment so said ergonomic mouse body does not move unless directly manipulated by the operator; h) a low-effort, single-movement to lock or unlock, position lock of said locking mechanism integral to said ball-and-socket mechanism and generally located on the underside of said ergonomic mouse body which locks said ball-and-socket mechanism in place to prevent movement between said ergonomic mouse body and said pedestal during mouse control operation, thereby preserving the operator selected, ergonomically optimal positioning for zero-motion computer screen cursor control operation.

2. The method of use for the device of claim 1 wherein: a) the ergonomic mouse operator can manually swivel the ergonomic mouse body in a wide range of orientations defined by three axis of movement so that the optimal ergonomic positioning for the operator of the ergonomic mouse body in varying workstation configurations can be obtained; b) the ability for the operator to lock and retain the selected orientation of the ergonomic mouse body with the low-effort, single-movement to lock or unlock, position lock so that no movement of said ergonomic mouse body will occur during its operation; c) whereby with no movement of said ergonomic mouse body in a locked position, the ergonomic mouse operator does not need to move the selected ergonomically optimal hand, wrist and arm positioning for operation; d) whereby the ergonomic mouse operator can fully manipulate computer screen cursor movement with the prior art thumb-actuated miniature cursor control joystick so that only minute thumb movements are required thereby preserving the ergonomically optimal zero-motion operation of said ergonomic mouse.

* * * * *